3,297,734
PURIFICATION OF SULFONATED MONOMERS
Ardy Armen, Williamsburg, and John H. Hennes, Newport News, Va., assignors to The Dow Chemical Company, Midland, Mich., a corporation of Delaware
No Drawing. Filed Nov. 4, 1963, Ser. No. 321,293
18 Claims. (Cl. 260—429.9)

This invention relates to a method for the purification of sulfonated monomers and particularly to the purification of polymerizable ethylenically unsaturated sulfonated monomers.

Sulfonated monomers having ethylenic unsaturation through which polymerization can propagate are useful for many purposes, but primarily they are employed in the preparation of homopolymers and copolymers with other functional monomers. These polymers provide special advantages for use in such applications as ion exchange resins, emulsifiers, thickeners, detergents, as dye receptive additives in synthetic fibers, etc. The monomers are equally well suited for copolymerization with other functional monomers for the preparation of polymers especially tailored for numerous requirements. For example, the polymerizable sulfonated monomers can be polymerized, in many instances, with monomers conventionally used to prepare fiber-forming polymers to provide functional properties such as improved dyeability to the fibers prepared therefrom.

It has been observed that oftentimes when ethylenically unsaturated sulfonated monomers are polymerized to form homopolymers and copolymers the results are unexplainably erratic, that is, the rate of polymerization and degree of polymerization varies from one batch or polymerization reaction to another. The change in rate of polymerization may not be of significant importance when homopolymers of the monomers are being formed, save the extra time involved if a decrease is observed, however, the desired molecular weight range or degree of polymerization of the polymer may be extremely important. Moreover, when copolymers are being made the rate of polymerization is also necessarily closely controlled from one polymerization to another if consistent polymer products are to be obtained. Otherwise, varying amounts of each of the copolymerizing monomers is likely to wind up in the polymer chain resulting in polymers of different compositions and properties. The unpredictable nature of many of these sulfonated monomers is thought to be caused by impurities entrained in the monomer charge. These impurities may be carried over from the synthesis of the monomers or subsequent handling and treating processes. They may also be introduced when part of a monomer charge is obtained from a prior polymerization medium. This often occurs when a recycle polymerization system is employed where a polymerization is not carried to complete conversion, the polymer is separated from the medium and additional monomer is added and another polymerization is begun. Thus, some residual polymer and other constituents are usually present and often interfere with the polymerization reaction. Various means have been used to purify the sulfonated monomers in order to rectify the erratic polymerization including recrystallization, solvent extraction, activated charcoal treatments, chromatography and distillation. For the most part these methods are not satisfactory from the standpoint of being either ineffective to solve the problem or too tedious, time consuming and costly.

It is the chief object and primary concern of the present invention to provide a relatively simple, expedient and efficient means for purifying polymerizable ethylenically unsaturated sulfonated monomers by a means that produces uniform and consistent results. It is a further object to bring about the dual removal of polymeric material and color bodies from an aqueous solution of such sulfonated monomers utilizing, for all practical purposes, the same removal agent.

Further objects and advantages are manifest in the present purification method which comprises mixing with an aqueous solution of a polymerizable ethylenically unsaturated sulfonated monomer a zirconium compound capable of forming in the solution the $ZrOOH^+$ ion, the solution having a pH less than about 3.0 after mixing with the zirconium compound; then mixing with the solution a base dispersible in the solution and inert to the sulfonated monomer to raise the pH of the solution to at least about 3.5; and, subsequently, separating, e.g., by filtration, the precipitated material or insoluble phase from the solution and recovering a substantially more pure solution of the sulfonated monomer.

If the sulfonated monomer is in the form of a sulfonic acid, generally, better results are achieved if the sulfonic acid is first converted to a salt form by neutralizing the sulfonic acid with an inorganic basic salt. Although not essential to the invention, purifying the salt form of the sulfonated monomers is a preferred embodiment of the invention. Otherwise, part of the sulfonic acid may be converted to an unwanted salt by the purifying constituents during the purification treatment. If desired, the sulfonate monomer salt can be converted back to the acid form either before or during subsequent processing.

If desirable, the purification can be performed in two distinct steps. This will generally depend on the kind and quantity of the impurities in the solution. Thus, for example, when the monomer is recycle monomer (i.e., part of a monomer charge that has been polymerized) it may contain some residual polymer or low molecular weight polymer in addition to other impurities including spent catalyst and decomposition products and other impurities picked up in processing. When this is the case, upon addition of the zirconium compound, e.g., zirconyl oxychloride, it is usually observed that any residual polymeric products are selectively precipitated. This precipiated material can be filtered out of the solution. Following this, a suitable base is added to raise the pH of the solution and convert the remaining zirconium salt to insoluble zirconia. This formation of zirconia, in situ, in solution serves excellently to remove color bodies and other unidentified impurities from the solution which are removed from the solution with the zirconia during the second filtration. It is not necessary that two separations or filtrations be employed. The first precipitated material can be removed with the material precipitated with the zirconia in a single operation. The choice of whether one or two filtrations are used is more or less a balance between the amount and kind of impurities that are removed and the ease of filtration of the solution.

It is surprising that the zirconium treatment is so selective and leaves the sulfonated monomer in solution essentially unaffected while causing precipitation of or otherwise removing by absorption or some other phenomena polymeric and other impurities. Thus, by way of example, it has been observed that when a solution of sulfoethylmethacrylate containing minor amounts of polymerized sulfoethylmethacrylate, methacrylic acid, polymethacrylic acid and peroxides of organic sulfonic acids is treated in accordance with the invention, these latter materials are selectively removed while leaving in solution an excellent yield of essentially pure sulfoethylmethacrylate.

Any of a wide variety of ethylenically unsaturated sulfonated monomers can be treated for purification thereof with the herein described method. Advantageously, those sulfonated monomers that have relatively high water solubility are purified by this method, although those having lesser solubilities can also be treated. The concentration of the solution with respect to the monomer being treated is not critical. For obvious reasons concentrations above the saturation concentration are to be avoided since any monomer that is precipitated will be removed and generally lost with the precipitated impurities.

Exemplary of the sulfonated monomers that can be purified with the present method include sulfonated alkenyl aromatic monomers of the structural formula:

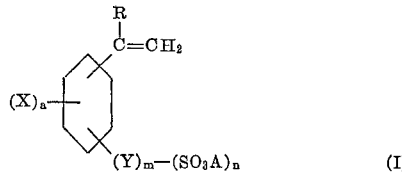

wherein R is selected from the group consisting of hydrogen, and methyl; X is individually selected from the group consisting of hydrogen, chlorine, bromine, and alkyl radicals containing from 1 to 8 carbon atoms; Y is selected from the group consisting of bivalent and trivalent hydrocarbon radicals containing 1 to 4 carbon atoms; A is selected from the group consisting of hydrogen, alkali metals, alkaline earths (Ca, Ba, Sr) or the transition metals (Zn, Cu, Ni, Co, Fe, Mn, Cr, V, Ti), and alkyl radicals containing 1 to 5 carbon atoms; $a$ is an integer from 1 to 4; $m$ has a numerical value in whole units of 0 to 1; $n$ is an integer from 1 to 2; sulfonated olefin monomers of the structural formula:

$$CH_2=CZ-(Y)_m-(SO_3A)_n \qquad (II)$$

wherein Z is selected from the group consisting of hydrogen, chlorine, bromine, carboxyl radicals, aryl radicals containing from 6 to about 12 carbon atoms, and alkyl radicals containing from 1 to 8 carbon atoms, and Y, A, $m$ and $n$ are as defined above for monomer (I); and sulfonated acrylate and methacrylate monomers of the structural formula:

$$CH_2=CR-CO-Q-Y-(SO_3A)_n \qquad (III)$$

wherein Q is selected from the group consisting of divalent sulfur (—S—), oxygen (—O—) and amide nitrogen (—NR—); and R, Y, A, and $n$ are as defined above for monomer (I).

The sulfonated aromatic and the sulfonated olefin monomers have been described and are involved in U.S. Patent No. 2,527,300, and the sulfonated acrylate and methacrylate monomers in U.S. 3,024,221. Typical of the various sulfonated monomers that may be employed with benefit in the practice of the present invention are those included in the following tabulations, grouped according to general type:

TABLE I

*Typical sulfonated aromatic monomers of Formula I* para-styrene sulfonic acid
ortho-styrene sulfonic acid
para-isopropenyl benzene sulfonic acid
para-vinyl-alpha-toluene sulfonic acid
para-isopropenyl-alpha-toluene sulfonic acid
sodium para-styrene sulfonate
potassium ortho-styrene sulfonate
methyl para-styrene sulfonate
ethyl para-vinyl-alpha-toluene sulfonate
isopropyl para-isopropenyl benzene sulfonate
n-butyl ortho-styrene sulfonate
2-chloro-4-vinylbenzene sulfonic acid
2-bromo-4-isopropenyl benzene sulfonic acid
3-vinyl toluene 6-sulfonic acid, sodium salt
3-ethyl-4-vinyl-benzene sulfonic acid
2,3-dichloro-4-vinyl benzene sulfonic acid
1,3-disulfo-2-(4-vinyl benzyl)propane

TABLE 2

*Typical sulfonated olefin monomers of the Formula II* ethylene sulfonic acid
sodium ethylene sulfonate
potassium ethylene sulfonate
methyl ethylene sulfonate
isopropyl ethylene sulfonate
1-propene 2-sulfonic acid
1-propene 3-sulfonic acid
1-propene 3-sulfonic acid, ethyl ester
1-butylene 4-sulfonic acid, n-butyl ester
1-butylene 3-sulfonic acid
2-methyl 1-propene 3-sulfonic acid

TABLE 3

*Typical sulfoalkylacrylates of the Formula III*

2-sulfoethylacrylate
2-sulfoethylmethacrylate, sodium salt
2-sulfoethylmethacrylate, methyl ester
2-sulfoethylmethacrylate, potassium salt
3-sulfopropylacrylate, sodium salt
1,3-disulfo 2-propanol ester of methacrylic acid

TABLE 4

*Typical acryloyl taurines of the Formula III*

N-acryloyl taurine
N-acryloyl taurine, sodium salt
N-methacryloyl taurine, methyl ester
N-methacryloyl taurine, potassium salt
N-acryloyl taurine, ethyl ester
N-acryloyl-aminopropane sulfonic acid
N-methacryloyl-aminopropane sulfonic acid, sodium salt As indicated, any of the foregoing and associated sulfonic acids can, and preferably are, converted to salts before being purified by the present method. This is advantageously accomplished by adding the dry monomer to an aqueous solution or slurry of the neutralizing salt. It is generally observed that if the reverse procedure is used, i.e., adding the neutralizing salt to an aqueous solution of the monomer, undesirable hydrolysis of monomers containing ester groups results.

Preferably, a monomer solution of not greater than about 25–30 weight percent monomer is treated. If a higher concentration is employed there may be incomplete and sometimes very little precipitation of impurities when the zirconium compound is first added, although removal of impurities is still effected when the zirconia is formed with addition of the base.

Any of the zirconium compounds that will form the $ZrOOH^+$ cation in solution can be employed in the purification of the sulfonated monomers. Exemplary of some of the suitable zirconium compounds are zirconium oxychloride (or more often referred to as zirconyl chloride, $ZrOCl_2$) which is generally available as the octahydrate; zirconium tetrachloride (which will hydrolyze in water to $ZrOCl_2$ and HCl); zirconium oxybromide; zirconium oxyiodide; zirconium oxythiocyanate; zirconium oxynitrate; etc. Advantageously, zirconium oxychloride is employed. It is generally observed that the commonly available zirconium compounds, including the foregoing, may contain in the neighborhood of from about 0.4 to 2.5 percent hafnium, but this is not observed to significantly influence the results since the chemical reactivity and behavior of zirconium and hafnium are apparently quite similar.

The zirconium compound is preferably added as a solution to the sulfonated monomer solution. This facilitates dissolution of the zirconium compound in the monomer solution and assures better mixing and contacting with the impurities. Any solution concentration of the zirconium compound can be added. Generally, a relatively concentrated solution is used to avoid unnecessary dilution of the monomer solution since this will usually increase filtration or separation time. About a 30 percent solution of the zirconium compound is conveniently used.

Any amount of the indicated type of zirconium compound that is mixed with the sulfonated monomer solution will provide some purification. The required amount will depend primarily on the amount of impurities in the monomer solution and the degree of purity desired, the latter of which will normally depend on the end use to which the monomer is to be put. The necessary amount of the zirconium compound can be readily determined by treating a sample of the monomer solution with a known amount of the zirconium compound. Or, if the amount of impurities present in the monomer solution is first ascertained a calibrated amount of the zirconium compound can then be added. It is generally desirable that an excess, on a weight basis, of the zirconium compound over the impurities be employed. An excess does no harm as long as the removal with the subsequent pH elevation is efficiently accomplished. If the amount of impurities are high, it may be desirable or necessary to treat the solution two or more times rather than attempting to effect the purification in a single treatment. This will depend in large extent on the ease of filtration of the solution after the precipitating reactions.

The base that is used to raise the pH of the solution to form zirconia in situ can be any suitable base dispersible in the monomer solution that is inert to the sulfonated monomer, that is, one that will not cause decomposition of or otherwise deleteriously affect the monomer. Advantageously, when the sulfonated monomer is a salt of a sulfonic acid, the base that is employed is one having a cation common with the cation of the sulfonate monomer. For example, if the sulfonate salt is the sodium or zinc salt then NaOH or ZnO, respectively, are used as the base to elevate the pH above about 3.5. This reduces or eliminates introducing foreign ions. Other suitable basic materials can be employed such as MgO, CaO, KOH, NH$_4$OH.

The amount of the base needed depends principally upon the pH of the monomer solution and the quality of the solution that is being purified. As indicated, enough of the base should be added to raise the pH to at least about 3.5. Advantageously, the pH is raised to between about 3.5 and 7; however, a higher pH can be attained in the present practice, the efficiency is not necessarily enhanced. Raising the pH to at least 3.5 and preferably to at least about 4.0 assures essentially complete removal of the zirconium. When this method is followed the filtered solution is usually found to contain less than 40 p.p.m. of zirconium. Zirconium removal to this level may be essential if the monomer is to be polymerized as the presence of zirconium may interfere with polymerization.

The purification treatment is conveniently conducted at ambient temperature. Higher or lower temperatures can be used but are not of particular advantage. As a matter of fact, elevated temperatures are best avoided lest premature polymerization of the sulfonated monomer occur.

The time allowed for the treatment is not critical. For economy purposes, it is accomplished as readily as feasible, balancing the need for purity against the time to obtain the desired purity. Sufficient time should be allowed for adequate mixing in each stage. The longer parts of the treatment are generally encountered in the filtration or separation steps.

Any conventional means can be used to separate the precipitated impurities and zirconia from the monomer solution. Conventional vacuum filtration techniques are adequate for the purpose. Any conventional filter aid may be added to facilitate filtration.

The yields of the purified monomer solution that are obtained, based on the original unpurified solution, will vary depending on the purity of the starting solution, the care exercised in performing the operations, and the number of washings given the precipitated material. If the precipitated material is rather voluminous it may carry with it relatively large quantities of liquid. Depending on the above factors, yields ordinarily run from 50–90 percent.

The following examples will serve to further illustrate the invention wherein, unless otherwise specified, all parts and percentages are by weight.

EXAMPLE 1

Among other incidents, the problem solved by this invention was encountered when attempts were made to polymerize 2-sulfoethylmethacrylate (SEMA) with other monomers, for example acrylonitrile. In normal practice, the polymerization conditions are established for the principal or predominating monomer(s) after which other monomers can be added to the feed stream to produce a copolymer or terpolymer. It was found that SEMA, when used as manufactured, profoundly upset the predetermined polymerization conditions and made it difficult, if not impossible, to bring the polymer product within specifications. In one instance the polymerization would be accelerated when the SEMA was added and in another instance polymerization would be completely arrested. It was observed, however, that when purified SEMA was employed consistent polymerization results were obtained. Various methods were employed to prepare suitably purified SEMA including the following:

a. *Recrystallization.*—Some very pure samples of crystalline zinc 2-sulfoethylmethacrylate (Zn(SEMA)$_2$) were prepared. The method was time-consuming, required a great deal of equipment and raised the price of the monomer considerably. In addition, the product was found to have poor storage stability. Apparently crystalline Zn(SEMA)$_2$ has the property of reacting with atmospheric oxygen to form peroxides which, in turn, catalyze its polymerization.

b. *Solvent extraction.*—A Zn(SEMA)$_2$ solution was prepared from crude 2-sulfoethylmethacrylate and aliquots were repeatedly extracted with the following solvents: chloroform, carbon tetrachloride, methylene dichloride, benzene and perchloroethylene. Of these, the most effective were methylene dichloride and chloroform. Both solvents succeeded in removing some of the color and a portion of the methacrylic acid impurity but neither gave really adequate results. The marginal improvements obtained would not justify the cost of using this procedure.

c. *Charcoal decolorization.*—Passing a Zn(SEMA)$_2$ solution through a bed of activated charcoal was found to remove the color from the solution and some of the methacrylic acid. Difficulty was encountered by a marked tendency of the solution to polymerize when in contact with the charcoal. This condition could be improved by first washing the charcoal with a solution of hydroquinone but this, in turn, resulted in an undesirable increase in the hydroquinone content of the purified solution. It was also found that the decolorized solutions would slowly revert back to their original color.

d. *Chromatography.*—Using standard techniques no marked improvement in color was noted when a Zn(SEMA)$_2$ solution was passed through a column of Chromosorb W.

e. *Distillation.*—This method in all its various forms, i.e., molecular, azeotropic, falling film, extractive, vacuum, etc., is regarded as impractical because of the high boiling point of the compound and its extreme heat lability.

In contrast, using the following method in accordance with the invention excellent results were achieved from all viewpoints:

Zirconium oxychloride octahydrate, 40 parts, was dissolved in 300 parts of distilled water and one part of p-methoxyphenol was added as a stabilizer. The solution was stirred and powdered zinc 2-sulfo-ethylmethacrylate, 100 parts, was slowly added. After standing for a period sufficient to permit precipitation of the impurities, which varied from several minutes to several hours depending on the purity of the starting $Zn(SEMA)_2$, the mixture was filtered. The filtrate, which was quite acidic as a result of hydrolysis of the zirconium oxychloride, was neutralized by the addition of an excess of zinc oxide and refiltered to remove zirconia. The purified $Zn(SEMA)_2$ solution thus obtained could be used as obtained, or, concentrated by removing water at room temperature under reduced pressure.

EXAMPLE 2

One hundred parts of an aqueous solution of $Zn(SEMA)_2$ which analyzed 30.1% $Zn(SEMA)_2$ was mixed with a solution composed of six parts zirconium oxychloride, 25 parts distilled water and 0.1 part hydroquinone. After standing a suitable period the precipitated solids (4.2 parts) were removed by filtration. Neutralization of the filtrate with zinc oxide and refiltering yielded approximately 130 parts of a 23% $Zn(SEMA)_2$ solution.

EXAMPLE 3

Two solutions were prepared as follows:

a. 600 parts of 90.4% $Zn(SEMA)_2$ and 1200 parts distilled water.

b. 120 parts zirconium oxychloride octahydrate $$(ZrOCl_2 \cdot 8H_2O) + 0.6$$

part hydroquinone and 600 parts distilled water.

The solutions were combined and stirred for one hour. The precipitated solids were removed by filtration and 48 parts of zinc oxide were added to the filtrate. This mixture was stirred until its pH was 5.5 and the excess zinc oxide was removed to give 2018 parts of a colorless solution which analyzed 21.5% $Zn(SEMA)_2$ (80% yield).

EXAMPLE 4

One hundred and twenty-nine parts of powdered sodium styrene sulfonate, 77.5% unsaturation analysis, was dissolved in 500 parts distilled water and mixed with a solution of 50 parts $ZrOCl_2 \cdot 8H_2O$ and 0.5 part hydroquinone in 50 parts water. The resulting yellow precipitate was removed. The filtrate was neutralized and refiltered to yield 500 grams of a clear 10% sodium styrene sulfonate solution.

EXAMPLE 5

A solution of 20 parts $ZrOCl_2 \cdot 8H_2O$ and 0.1 part hydroquinone in 300 parts distilled water was prepared. Sodium 2-sulfoethylacrylate, 100 parts, was slowly added to the stirred solution. A brown foamy precipitate formed which was removed by filtration and the filtrate was neutralized with zinc oxide and refiltered. An essentially clear solution of sodium 2-sulfoethylacrylate was obtained.

EXAMPLE 6

A 25% solution of sodium 2-sulfoethylmethacrylate was prepared by neutralizing 49.6 grams of 96% pure (0.25 mole) 2-sulfoethylmethacrylate with 166.6 grams of a 6% sodium hydroxide solution. The ester was added slowly to the cooled, stirred caustic solution. The 25% NaSEMA solution, which had a dark brown color, was purified by adding 10 ml. of 30% zirconium oxychloride, removing the precipitate, neutralizing the filtrate with 10 ml. of a 20% sodium hydroxide solution and removing the precipitated zirconia by filtration. The filtrate had a very pale yellow color. It weighed 170.7 grams and analyzed 19.1% NaSEMA (67% yield).

EXAMPLE 7

A zinc oxide slurry was prepared from 28 pounds of zinc oxide and 340 pounds of water. 2-sulfoethylmethacrylate, 100 pounds, was metered into the cooled agitated slurry at a rate sufficiently slow to keep the temperature below 30° C. After completion of the addition the solution was stirred for an additional 30 minutes and ten pounds of filter Aid were added. The pH of this solution was above 4.0. It was filtered and the filtrate combined with 22.5 pounds of an aqueous 30% zirconium oxychloride solution and ten grams of p-methoxyphenol. The mixture was agitated for two hours. (At this point the liquid portion was tested by adding additional $ZrOCl_2$ solution to a small sample.) (If it became turbid an additional six pounds of 30% $ZrOCl_2$ were added and the procedure repeated until it passed the test. Usually further treatment was unnecessary.) The agitated mixture was then mixed with 50 pounds of Filter Aid and filtered. The solution was neutralized with 4.5 pounds of zinc oxide (if the pH was not above 4.0 additional zinc oxide was added), combined with 25 pounds of Filter Aid and filtered. The filtrate obtained was then used in a continuous polymerization process. It performed smoothly and gave a product of more uniform composition and superior properties to that formed from the unpurified monomer.

Similar excellent results to the foregoing are obtained when the method of the invention is employed to purify other ethylenically unsaturated sulfonated monomers and when other of the zirconium compounds are used that form the $ZrOOH^+$ ion in solution.

It is to be understood that the invention is not to be limited by the foregoing specifically delineated embodiments, but rather, it is to be interpreted by the scope of the hereto appended claims.

What is claimed is:

1. The method for purifying a polymerizable ethylenically unsaturated sulfonated monomer of the structural formula selected from the group consisting of (I)

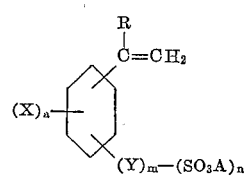

wherein R is selected from the group consisting of hydrogen, and methyl; X is individually selected from the group consisting of hydrogen, chlorine, bromine, and alkyl radicals containing from 1 to 8 carbon atoms; Y is selected from the group consisting of bivalent and trivalent hydrocarbon radicals containing 1 to 4 carbon atoms; A is selected from the group consisting of hydrogen, alkali metals, alkaline earths (Ca, Ba, Sr) or the transition metals (Zn, Cu, Ni, Co, Fe, Mn, Cr, V, Ti), and alkyl radicals containing 1 to 5 carbon atoms; $a$ is an integer from 1 to 4; $m$ has a numerical value in whole units of 0 to 1; $n$ is an integer from 1 to 2;

(II) $\quad CH_2=CZ-(Y)_m-(SO_3A)_n$ wherein Z is selected from the group consisting of hydrogen, chlorine, bromine, carboxyl radicals, aryl radicals containing from 6 to about 12 carbon atoms, and alkyl radicals containing from 1 to 8 carbon atoms, and Y, A, $m$ and $n$ are as defined above for monomer (I);

(III) $\quad CH_2=CR-CO-Q-Y-(SO_3A)_n$ wherein Q is selected from the group consisting of divalent sulfur (—S—), oxygen (—O—) and amide nitrogen (—NR—); and R, Y, A, and $n$ are as defined above for monomer (I) comprising (a) mixing with an aqueous solution of said monomer a zirconium compound capable of forming in said solution the $ZrOOH^+$ ion, said solution after mixing with said zirconium compound having a pH less than about 3.0; then, (b) mixing with said solution a base dispersible in said solution and inert to said monomer to raise the pH of said solution to at least about 3.5; and, (c) subsequently separating the insoluble phase from said solution and recovering said solution containing said sulfonated monomer.

2. The method of claim 1, wherein said zirconium compound is zirconium oxychloride.

3. The method of claim 1, wherein said sulfonated monomer is an inorganic salt of a sulfonic acid monomer.

4. The method of claim 3, wherein said monomer is zinc 2-sulfoethylmethacrylate.

5. The method of claim 3, wherein said monomer is sodium 2-sulfoethylmethacrylate.

6. The method of claim 3, wherein said monomer is sodium 2-sulfoethylacrylate.

7. The method of claim 3, wherein said monomer is sodium styrene sulfonate.

8. The method of claim 3, wherein the cation of said inorganic salt of a sulfonic acid monomer is the same as the cation of said base that is mixed with said solution to raise the pH thereof.

9. The method of claim 8, wherein said salt is a zinc salt and said base is zinc oxide.

10. The method of claim 8, wherein said salt is a sodium salt and said base is sodium hydroxide.

11. The method of claim 1 and in combination therewith the additional step of separating the insoluble phase from said solution after mixing said zirconium compound of step (a) and before mixing with said solution said base of step (b).

12. The method for purifying zinc 2-sulfoethylmethacrylate comprising
(a) mixing zirconium oxychloride with an aqueous solution of zinc 2-sulfoethylmethacrylate, said solution after mixing with the zirconium oxychloride having a pH less than about 3.0; then
(b) mixing with said solution sufficient zinc oxide to raise the pH of said solution to at least about 3.5; and,
(c) subsequently separating the insoluble phase from said solution and recovering said solution containing the zinc 2-sulfoethylmethacrylate.

13. The method of claim 12 and in combination therewith the additional step of separating the insoluble phase from said solution after mixing said zirconium oxychloride of step (a) and before mixing with said solution said zinc oxide of step (b).

14. The method for purifying a salt of 2-sulfoethylmethacrylate comprising
(a) mixing essentially dry 2-sulfoethylmethacrylate with an aqueous basic solution having dispersed therein an inorganic base capable of neutralizing the 2-sulfoethylmethacrylate and forming an inorganic salt thereof;
(b) mixing zirconium oxychloride with said solution, said solution after mixing with the zirconium oxychloride having a pH less than about 3.0; then,
(c) mixing with said solution a base dispersible in said solution to raise the pH of said solution to at least about 3.5, said base of step (a) and the base of this step (c) having the same chemical composition; and,
(d) subsequently separating the insoluble phase from said solution and recovering said solution containing said salt of 2-sulfoethylmethacrylate.

15. The method of claim 14, wherein said base is zinc oxide.

16. The method of claim 14, wherein said base is sodium hydroxide.

17. The method of claim 14 and in combination therewith the additional step of separating from said solution insoluble base remaining after said neutralizing of step (a) and before mixing with the zirconium oxychloride of step (b).

18. The method of claim 14 and in combination therewith the additional step of separating the insoluble phase from said solution after mixing the zirconium oxychloride of step (b) and before mixing with said solution said base of step (c).

No references cited.

TOBIAS E. LEVOW, *Primary Examiner.*

H. M. S. SNEED, *Assistant Examiner.*